US006199074B1

(12) United States Patent
Kern et al.

(10) Patent No.: US 6,199,074 B1
(45) Date of Patent: Mar. 6, 2001

(54) DATABASE BACKUP SYSTEM ENSURING CONSISTENCY BETWEEN PRIMARY AND MIRRORED BACKUP DATABASE COPIES DESPITE BACKUP INTERRUPTION

(75) Inventors: Robert Frederic Kern; William Frank Micka, both of Tucson, AZ (US); Jeffrey Mark Nick, Fishkill, NY (US); Larry Richard Perry, Gilroy, CA (US); David Bradley Petersen, Great Falls, VA (US); Harold Glen Slone, Los Gatos, CA (US); Gail Andrea Spear, Tucson, AZ (US); Harry Morris Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/286,389

(22) Filed: Apr. 5, 1999

Related U.S. Application Data

(63) Continuation-in-part of application No. 08/948,529, filed on Oct. 9, 1997, now abandoned.

(51) Int. Cl.[7] ..................................................... G06F 17/30
(52) U.S. Cl. .......................... 707/204; 707/200; 707/201; 707/202; 707/203; 709/222
(58) Field of Search .......................... 707/1, 2, 10, 100, 707/200, 201, 202, 203, 204, 8; 700/10; 709/222, 223; 714/6; 717/3; 379/265

(56) References Cited

U.S. PATENT DOCUMENTS

| 5,261,089 | * | 11/1993 | Coleman et al. ...................... 707/8 |
| 5,384,697 | * | 1/1995 | Pascucci ............................. 700/10 |
| 5,444,851 | * | 8/1995 | Woest ............................... 709/222 |

(List continued on next page.)

OTHER PUBLICATIONS

Christensen, Rodney, "Choices mark NetWare 4.0 backup", Computer Technology Review, Los Angeles, CA vol. 13, Issue 10, Start Page 20, Sep. 1993.*

(List continued on next page.)

*Primary Examiner*—Hosain T. Alam
*Assistant Examiner*—Shahid Alam
(74) *Attorney, Agent, or Firm*—Dan Hubert & Assoc.

(57) ABSTRACT

A database management system ensures consistency between primary and mirrored backup copies of a database, despite occurrence of a suspending condition interrupting the normal process of mirroring the primary database. One or more primary controllers are provided, each having a data storage unit with multiple primary data storage devices. Multiple secondary controllers each have multiple associated secondary data storage devices, each secondary controller being coupled to one primary controller. One or more primary databases reside on the primary devices, with a corresponding number of secondary databases residing on the secondary devices. Each secondary database mirrors a corresponding primary database. Either a host, attached to a primary controller, or one of the primary controllers itself, maintains a map cross-referencing each primary and secondary database with the primary and secondary devices containing portions thereof. If a predefined "suspending condition" affecting data mirroring occurs, the host or primary controller consults its map to identify all primary and secondary devices affected by the condition. Then, each primary controller stops all ongoing and future read/writes with each of its affected primary devices. Each primary controller also directs each secondary controller having an affected secondary device to stop mirroring the primary databases stored on that device. Then, the primary controller starts intermediate change recording and resumes read/writes with its primary devices. When the suspending condition ends, each primary controller applies the appropriate logged changes to its secondary database(s) and then reactivates each secondary database.

44 Claims, 4 Drawing Sheets

U.S. PATENT DOCUMENTS

| | | | | |
|---|---|---|---|---|
| 5,446,884 | * | 8/1995 | Schwendemann et al. | 707/202 |
| 5,469,503 | * | 11/1995 | Butensky et al. | 379/265 |
| 5,485,608 | * | 1/1996 | Lomet et al. | 707/202 |
| 5,550,980 | * | 8/1996 | Pascucci et al. | 709/223 |
| 5,649,089 | * | 7/1997 | Kilner | 714/6 |
| 5,675,802 | * | 10/1997 | Allen et al. | 717/3 |
| 5,692,155 | | 11/1997 | Iskiyan et al. | 711/162 |
| 5,740,433 | * | 4/1998 | Carr et al. | 707/202 |
| 5,745,753 | * | 4/1998 | Mosher, Jr. | 707/202 |
| 5,794,254 | * | 8/1998 | McClain | 707/204 |
| 5,799,322 | * | 8/1998 | Mosher, Jr. | 707/202 |
| 5,835,915 | * | 11/1998 | Carr et al. | 707/202 |
| 5,884,072 | * | 3/1999 | Rasmussen | 709/223 |
| 6,088,717 | * | 7/2000 | Reed et al. | 709/201 |

OTHER PUBLICATIONS

Qazi, Naveed et al., "A Synchronization and Communication Model for Distributed Multimedia Objects", Proceedings of the first ACM international conference on Multimedia, pp. 147–155, Sep. 1993.*

* cited by examiner

DATABASE BACKUP SYSTEM ENSURING CONSISTENCY BETWEEN PRIMARY AND MIRRORED BACKUP DATABASE COPIES DESPITE BACKUP INTERRUPTION

CROSS-REFERENCE TO RELATED APPLICATIONS

This application is a continuation-in-part of Ser. No. 08/948,529 filed Oct. 9, 1997 now abandoned.

This application is related to U.S. Application No. 08/424,930, entitled "Consistent Command Control of Multiple Dual Copy Volumes", filed Apr. 19, 1995, in the names of J. L. Iskiyan et al. The entirety of the '930 application is hereby incorporated herein by reference.

BACKGROUND OF THE INVENTION

1. Field of the Invention

The present invention relates to data backup systems. More particularly, the invention concerns a database management system that ensures consistency between primary and mirrored backup copies of a database, despite the occurrence of a suspending condition that interrupts the normal process of backing up the primary database.

2. Description of the Related Art

Database management systems ("DBMSs") not only store large amounts of data, but they also facilitate the efficient access, modification, and restoration of this data. Data is typically stored using several different types of media, in order to provide efficient and cost effective data storage. Each type of media has certain features appropriate for the storage of certain types of data.

One type of data storage is electronic memory, usually dynamic or static random access memory ("DRAM" or "SRAM"). Electronic memories take the form of semiconductor integrated circuits storing millions of bytes of data. Access to such data occurs in a manner of nanoseconds. The electronic memory provides the fastest access to data since access is entirely electronic.

A second level of data storage usually involves direct access storage devices ("DASDs"). DASD storage usually involves magnetic and/or optical disks, which store bits of data as micrometer-sized magnetically or optically altered spots on a disk surface representing the binary "ones" and "zeros" that make up those bits of data. Magnetic DASD storage utilizes one or more disks coated with a remnant material. The disks are rotatably mounted within a protected environment. Each disk is divided into many concentric tracks, with the data being stored serially bit by bit, along each track. An access mechanism known as a head disk assembly ("HDA"), typically includes one or more read/write heads, and is provided in each DASD for moving across the tracks to transfer the data to and from the surface of the disks as the disks rotate past the read/write heads. DASDs can store gigabytes of data with access to such data typically being measured in milliseconds. Access to data storage in DASD is slower than electronic memory, since the disk and HDA must be physically positioned to access a desired data storage location.

Another type of data storage is a data storage library. In comparison to electronic memory and DASD storage, access to desired data in a library is not as fast since a robot is needed to select and load a data storage medium containing the desired data. Data storage libraries, however, provide significantly reduced cost for very large storage capabilities, such as terabytes of data storage. Data storage libraries often utilize tape media, for safe keeping of data stored on other media such as DASD or electronic memory. Access to data stored in today's libraries is usually measured in seconds.

Having a backup data copy is mandatory for many business that cannot tolerate data loss. Some examples include stock brokers, businesses with internationally accessible data, telephone companies, and the like. Simply having the backup data available is sometimes not enough, though. It is also important to be able to quickly recover lost data. In this respect, the "dual copy" operation provides a significant improvement in speed over tape or library backup. One example of the dual copy operation involves providing "secondary" DASDs to closely mirror the contents of one or more primary DASDs. If the primary DASDs fail, the secondary DASDs can provide the necessary data From the user's perspective, one drawback to this approach is that it effectively doubles the number of DASDs required in the storage system, thereby increasing the costs of the system.

Another data backup procedure is the "remote dual copy" operation. With remote dual copy, data is continuously backed up at a site remote from the primary data storage. This backup may occur synchronously or asynchronously. A substantial amount of control data is required to realize this process, however, in order to communicate duplexed data from one host processor to another host processor, or from one storage controller to another storage controller, or some combination thereof. Unfortunately, overhead necessitated by the required control data which can interfere with a secondary site's ability to keep up with its primary site's processing, threatening the ability of the secondary site to recover the primary site's data if needed.

With both dual copy and remote dual copy, a primary DASD volume and secondary DASD volume form a duplex pair. Copying in the DASD subsystems is controlled by I/O commands to the copied volumes. Such I/O commands provide a device-by-device control for establishing or suspending duplex pairs, or queuing the status of a duplex pair. Device-by-device control, however, is not adequate for all disaster recovery applications. The copied data at the secondary location is usable only so long as that copied data is time-consistent with the original data. Typically, consistency is ensured by stopping the system while copying data, thus preventing further updates to the data. An improvement to this method is known as "T0" or "concurrent copy". Concurrent copy reduces the time needed to halt the system, but suspension is still required.

Another technique, "real time dual copy", ensures time consistency across the secondary volume. Examples of real time dual copy include extended remote copy ("XRC") and peer to peer remote copy ("PPRC"). Even with real time dual copy, however, primary system suspension is necessary for device-by-device control. The suspensions can cause undesirable disruptions in some systems, however. XRC systems provide a partial solution by using a software-controlled data mover, where a single command stops a session such that secondary devices are time consistent due in part to the asynchronous nature of the copy operation.

Thus, as shown above, it is difficult to accurately maintain two mirrored data bases that are entirely consistent with each other. Known backup solutions either temporarily halt storage to ensure consistency between primary and secondary systems, or simply tolerate a brief lag in updating the secondary system. Tens of thousands of I/O operations can occur in a single second. Therefore, even a short delay in updating data in the secondary system constitutes a significant lag in consistency. Any one of these many transactions could be a million dollar bond purchase. Consequently, even though many of the known backup solutions constitute significant advances and enjoy widespread commercial success today, International Business Machines Corp. is continually seeking to improve the performance and the efficiency of the systems to benefit its customers.

SUMMARY OF THE INVENTION

Broadly, the present invention concerns a database management system that ensures consistency between primary and mirrored backup copies of a database, despite the occurrence of a suspending condition that interrupts the normal process of backing up the primary database. As a specific example, the invention may be applied in the environment of a DBMS including a host computer coupled to a primary controller, with multiple primary data storage devices ("primary devices") each coupled to the primary controller. Likewise, multiple secondary data storage devices ("secondary devices") are each coupled to at least one secondary controller, each secondary controller being coupled to the primary controller.

Multiple primary databases may reside on the primary devices. Despite being managed by a common primary controller, each database may advantageously be maintained according to a different database software program, such as DB2, ORACLE, IMS, or another type of program. For each primary database, a mirrored secondary database resides on the secondary devices; each secondary database may reside on secondary devices of one secondary controller, or it may be spread across the devices of multiple secondary controllers. One of the hosts maintains an allocation map identifying, for each primary and each secondary database, which primary and secondary devices contain a portion of that database.

Normally, data mirroring is performed continuously, unless it is interrupted by a "suspending condition". Suspending conditions include the unavailability of one or more secondary controllers or devices, the unavailability of the primary controller or one or more primary devices, and/or failed communications between primary and secondary controllers. Suspending conditions are detected by the host and/or the primary controller.

In response to the suspending condition, the host identifies all primary and corresponding secondary databases affected by the suspending condition, and also identifies all primary and secondary devices that contain these databases. The host then uses this information to instruct the primary controller to discontinue all ongoing read/write operations to the identified primary device(s), and to prevent future data exchanges with this primary device(s). To carry out this directive, the primary controller issues a "disable R/W" command to the affected primary device(s).

The host also directs the primary controller to disable updating of the secondary databases mirroring the affected primary databases. In response, the primary controller issues a "disable updates" to the secondary controllers that manage secondary devices containing any portion of the secondary databases affected by the suspending condition. After issuing the "disable updates" command, the primary controller begins logging changes to the primary database. After the "disable updates" commands are carried out, the host issues an "enable R/W" command to the primary controller, permitting the primary controller to resume exchanging data with the previously disabled primary devices.

When the primary controller detects removal of the suspending condition, it begins to resynchronize the identified secondary database. Such detection may be achieved, for example, by the host notifying the primary controller of the suspending condition's removal, or by the primary controller sensing this condition itself. Resynchronization is performed by the primary controller applying its logged changes to the affected secondary database(s). Also, the primary controller reactivates each identified secondary database by issuing a "enable updates" command directing the secondary controllers to resume updating the secondary database to mirror the primary database.

Accordingly, as shown above, one embodiment of the invention may be implemented to provide a method to backup database data so as to maintain data consistency between primary and mirrored backup database copies despite any interruptions in the backup process. A different embodiment of the invention may be implemented to provide a data storage apparatus with mirrored primary and backup databases, where data consistency is ensured between primary and mirrored backup database copies despite any interruptions in the backup process. Still another embodiment of the invention may be implemented to provide a signal-bearing medium tangibly embodying a program of machine-readable instructions executable by a digital data processing apparatus to perform method steps to ensure data consistency between primary and mirrored backup database copies despite any interruptions in the backup process.

The invention affords its users with a number of distinct advantages. Importantly, the invention ensures consistency between a primary database and a mirrored secondary database, despite occurrence of a suspending condition such as lost communications or another failure that prevents normal database mirroring. Consistency is maintained even for dependent updates, because the "disable updates" command is issued to all secondary devices corresponding to the failed database.

Another advantage is that the invention minimizes data unavailability caused by the suspending condition. In particular, if the suspending conditions stems from a failure of a secondary device, controller, or communication therewith, the primary database is only unavailable during the brief period while the "disable R/W" command is effective. substantially instantaneously, with each secondary controller ceasing updates within seconds of each other. Accordingly, after the "disable updates" commands are successfully issued, an "enable R/W" command is used, permitting the primary controller to come back on line.

The invention is also beneficial since it facilitates the use of multiple secondary controllers with one primary controller, and also works well in an environment with multiple hosts and multiple primary controllers. The invention also provides a number of other advantages and benefits, which should be apparent from the following description of the invention.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

HARDWARE COMPONENTS & INTERCONNECTIONS

Multi-Host DBMS
Hardware Overview

Figure 1:
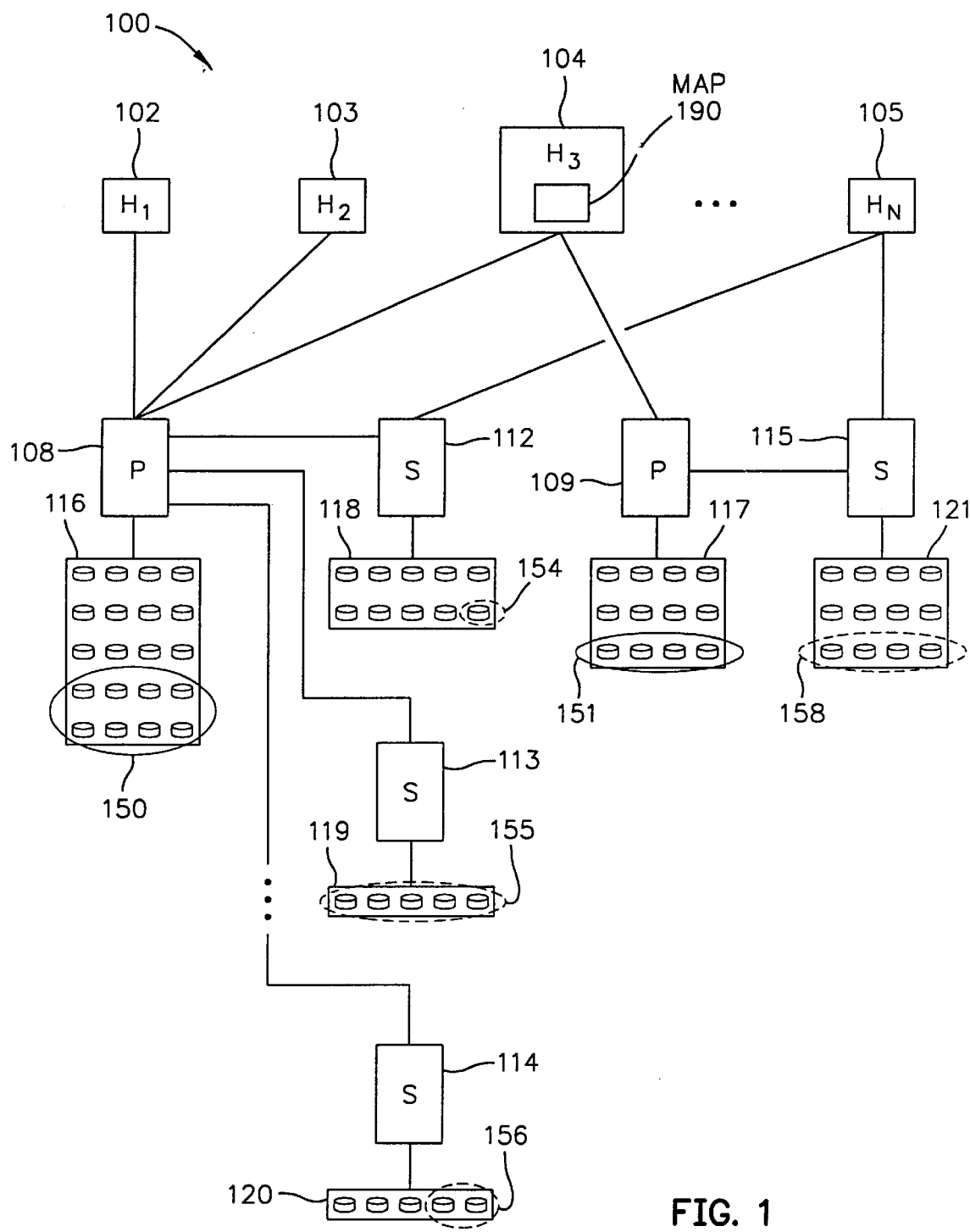
FIG. 1 is a block diagram of the hardware components and interconnections of a multi-host DBMS in accordance with the invention.

One aspect of the invention concerns a DBMS, which may be embodied by various hardware components and interconnections. FIG. 1 shows an exemplary DBMS 100, which includes a number of hosts 102–105, primary controllers 108–109, and secondary controllers 112–115. In the example of FIG. 1, three secondary controllers 112–114 are shown coupled to the primary controller 108, and one secondary controller 115 is shown with the primary controller 109. The number of secondary controllers associated with each primary controller may be increased or decreased according to the specific needs of the application. Preferably, each secondary controller is attached to its primary controller via a channel such as a channel link, telephone T1/T3 line, Enterprise Systems Connection ("ESCON") link, fiber optic link, computer network, long distance communications link or network, electromagnetic transmission link, or another appropriate suitable means to exchange data.

Also, each primary and secondary controller is coupled to a data storage unit. For instance, the primary controllers 108–109 are coupled to data storage units 116–117, and the secondary controllers 112–115 are coupled to the data storage units 118–121. A primary controller and its data storage unit(s) may be referred to as a primary "location" or "site". Likewise, a secondary controller and its data storage unit(s) may be called a secondary "location" or "site".

Each of the hosts 102–105, for example, may comprise a data processing machine such as an IBM System/370 or IBM System/390 processor, programmed to compute and manipulate data and execute data facility storage management subsystem/multiple virtual systems (DFSMS/MVS) software. Each of controllers 108–109 and 112–115 may comprise, for example, an IBM 3990 (model 6) storage controller, including a memory controller and one or more cache memory units. As an example, the data storage units 116–121 may comprise units from IBM 3390 (model 3) DASD storage subsystems. However, other types of storage may be used instead, such as optical disks, optical tape, magnetic tape, magnetic diskettes, solid state memory, or any other suitable storage medium.

Generally, each host 102–105 provides substantial computing power for running application programs, whereas the storage controllers 108–109/112–115 provide the subsidiary functions necessary to efficiently transfer, stage/destage, convert, and generally access large databases. The arrangement of FIG. 1 may be optimized for robust disaster recovery protection by storing a database at a primary site and storing a mirrored backup copy of the database on the associated secondary site, where the secondary site is separated from its primary site by a distance of feet, kilometers, or even thousands of kilometers, depending upon the user's desired level of protection. In addition to providing a backup copy, the secondary (or "remote") sites also have access to enough system information to take over processing for the primary site if the primary site becomes disabled.

Database Storage

Each data storage unit includes one or preferably multiple individual storage "devices". Preferably, each data storage unit includes multiple DASD devices such as a redundant arrays of inexpensive disks ("RAID").

The present invention contemplates storage of one or multiple databases in the primary data storage units 116–117. Each primary database may be stored in one primary data storage unit, or spread across both units 116–117. Each primary database (or portion) contained on a primary data storage unit is mirrored by a copy contained in one secondary data storage unit or spread across multiple secondary data storage units.

Each of the multiple primary databases may pertain to a different subject matter, format, organizational structure, version, or even different brands or types of database software. For example, the data storage unit 116 may contain a DB2 database, an ORACLE database, an IMS database, and a number of other databases organized under these or other database software programs.

In the specific example of FIG. 1, the primary controllers 108–109 cooperatively share management of a primary database, spread across the primary data storage units 116–117. This database, for example, may comprise a DB2 database. The primary database is contained on the primary devices 150–151. Alternatively, instead of spreading the primary database among primary devices of different primary controllers, the primary database may be consolidated (not shown) on the primary devices of a single primary controller if desired.

As illustrated, the primary database is mirrored by a secondary database, contained in the data storage units 118–121. Specifically, the secondary devices 154–156 mirror the portion of the primary database stored on the primary devices 150, and the secondary devices 158 mirror the portion of the primary database stored on the primary devices 151.

The allocation of backup data corresponding to the primary database is stored in an allocation map 190 maintained by one or more host, represented by the host 104 in the example of FIG. 1. For each primary database, the allocation map 190 specifically identifies the primary devices containing some or all of that database; the allocation map 190 also cross-references each primary device to its mirroring secondary device. For instance, in the case of the illustrated primary database, the allocation map 190 indicates that the primary database is stored on the devices 150–151, with the corresponding secondary database being stored on the secondary devices 154–156 and 158. Preferably, the allocation map 190 also works in reverse, where a specific secondary device can be indexed to identify the primary databases it mirrors.

Accordingly, each secondary data storage unit 118–121 may duplicate a portion of one primary database (contained in the corresponding primary data storage unit 116 or 117), a portion of multiple primary databases, or even the entirety of one or more primary databases. These and other data management techniques of the invention are described in greater detail below.

Single/No-Host DBMS
Hardware Overview

Figure 2:
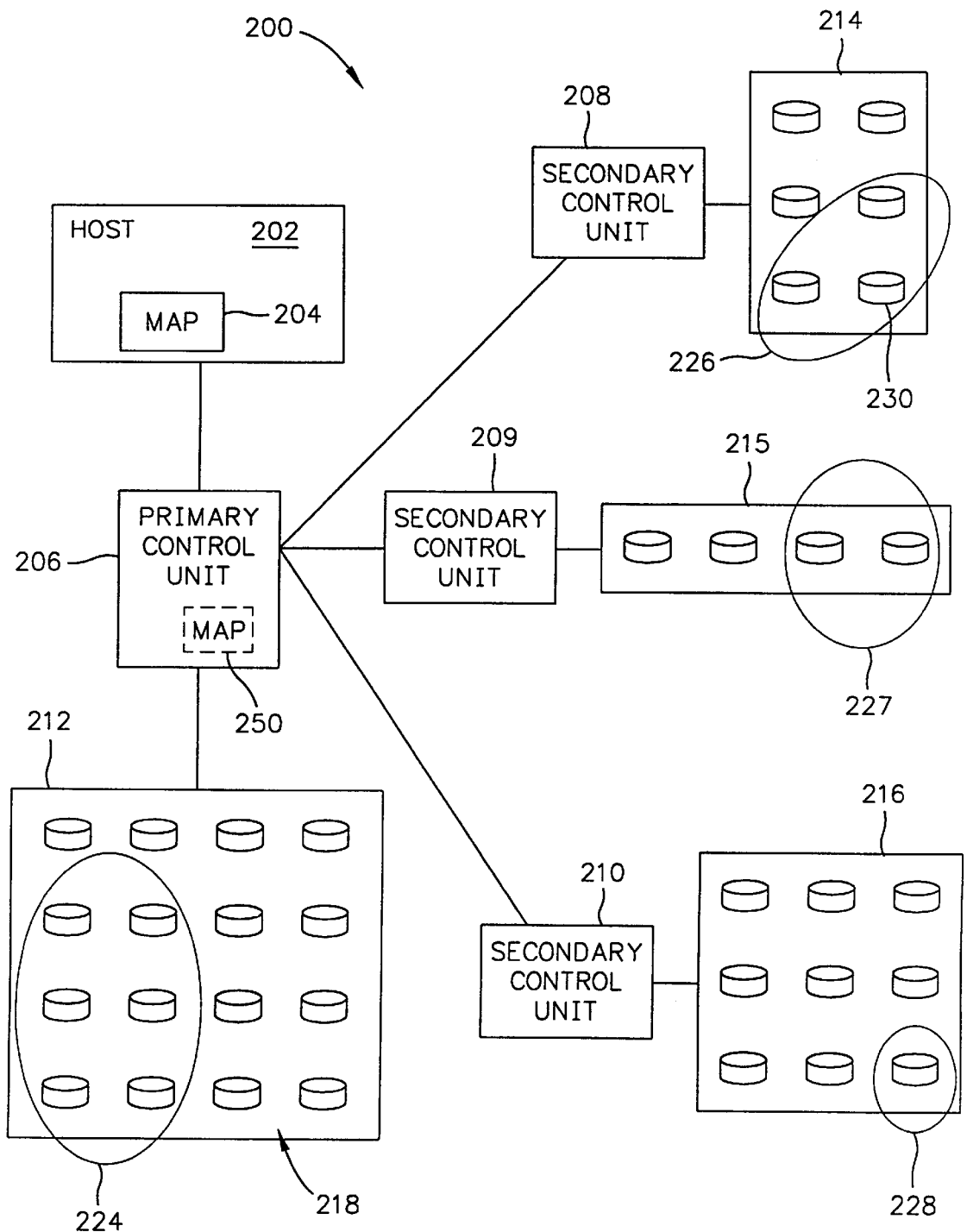
FIG. 2 is a simplified block diagram of a DBMS featuring an illustrative primary and secondary database pair in accordance with the invention.

In contrast to FIG. 1, the invention may be instead implemented to provide a single or no-host DBMS, as illustrated by the DBMS 200 (FIG. 2). The DBMS 200 includes a single host 202 coupled to a primary controller 206. The host 202 contains an allocation map 204 for the databases managed by the primary controller 206.

As an alternative, the separately illustrated host may be eliminated, with the primary controller 206 performing the necessary host functions; this constitutes a "no-host" environment. In the no-host environment, an allocation map 250 is used instead of the map 204.

The primary controller 206 is coupled to a data storage unit 212. The primary controller 206 is also coupled to multiple secondary controllers 208–210, each having respective data storage units 214–216. Preferably, each secondary controllers attached to its primary controller via a channel such as a channel link, telephone T1/T3 line, Enterprise Systems Connection (ESCON) link, fiber optic link, computer network, long distance communiations link or network, electromagnetic transmission link, or another appropriate suitable means to exchange data.

Database Storage

As in the example of FIG. 1, each data storage unit 212/214–216 of FIG. 2 incudes one or preferably multiple individual storage "devices". Preferably, each data storage unit includes multiple DASD devices such as a RAID arrangement.

These devices may be operated to store and allocate databases in a manner similar to the DBMS 200. For example, one or multiple databases may be contained in the primary data storage unit 212. And, each primary database contained in the primary data storage unit 212 is mirrored by a copy contained in one of the secondary data storage units 214–216, or spread across multiple secondary data storage units 214–216.

Each of the multiple primary databases may pertain to a different subject matter, format, organizational structure, version, or even different brands or types of database software. For example, the data storage unit 212 may contain a DB2 database, an ORACLE database, an IMS database, and a number of other databases organized under these or other database software programs.

In the example of FIG. 2, the data storage unit 212 includes a group of multiple sub-storage devices 224 constituting one primary database. As an example, this database may constitute a DB2 database. The database stored on the devices 224 is backed up by spreading it across the secondary data storage units 214–216. Particularly, some data is stored in the devices 226, other data on the devices 227, and the remaining data on the device 228.

The allocation of backup data corresponding to the primary database contained on the primary devices 224 is stored in the allocation map 204 (host environment) or in the allocation map 250 (non-host environment). The maps 204 or 250 operate similarly to the map 190 discussed above.

Accordingly, each data storage unit 214–216 may duplicate a portion of one primary database (contained in the data storage unit 212), a portion of multiple primary databases, or even the entirety of one or more primary databases. These and other data management techniques of the invention are described in greater detail below.

Exemplary Digital Data Processing Apparatus

Figure 3:
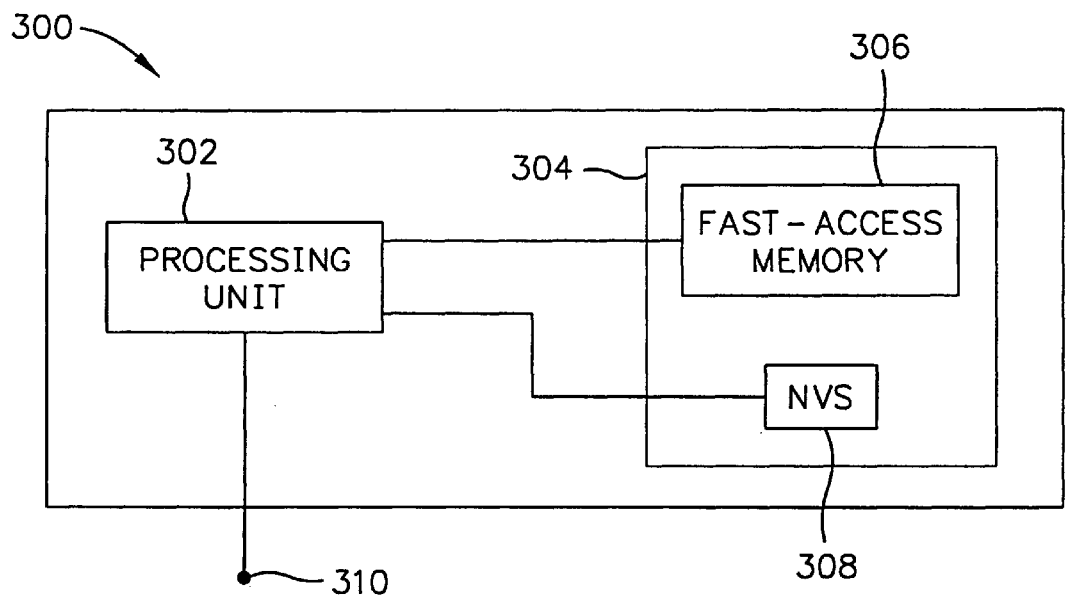
FIG. 3 is a block diagram of an illustrative digital data processing machine in accordance with the invention.

Another aspect of the invention concerns a digital data processing apparatus, which may be embodied by various hardware components and interconnections. FIG. 3 shows an example of one digital data processing apparatus 300. The apparatus 300 includes a processing unit 302, such as a microprocessor or other processing machine, coupled to a storage unit 304. In the present example, the storage unit 304 includes a fast-access memory 306 and nonvolatile storage 308. The fast-access memory 306 preferably comprises random access memory, and may be used to store the programming instructions executed by the processing unit 302 during such execution. The nonvolatile storage 308 may comprise, for example, one or more magnetic data storage disks such as a "hard drive", a tape drive, or any other suitable storage device. The apparatus 300 also includes an input/output 310, such as a line, bus, cable, electromagnetic link, or other means for exchanging data with the processing unit 302.

Despite the specific foregoing description, ordinarily skilled artisans (having the benefit of this disclosure) will recognize that the apparatus 300 may be still implemented in a machine of different construction, without departing from the scope of the invention. As a specific example, one of the components 306/308 may be omitted; furthermore, the storage unit 304 may be provided on-board the processing unit 302, or even provided externally to the apparatus 300.

OPERATION

In addition to the various hardware embodiments described above, a different aspect of the invention concerns a method for maintaining backup data in a DBMS.

Signal-Bearing Media

Such a method may be implemented, for example, by operating one or more digital data processing apparatuses (e.g., 300) to execute one or more sequences of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to maintain backup data in a DBMS.

Figure 4:
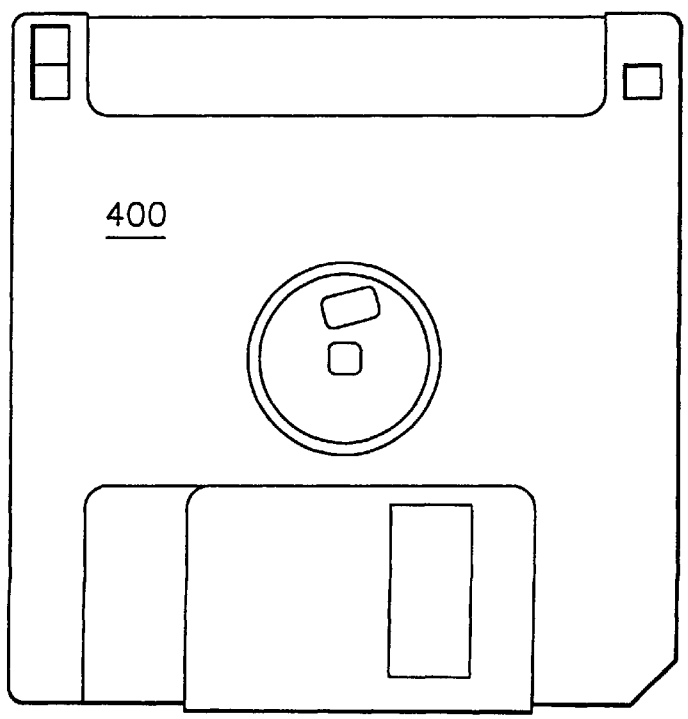
FIG. 4 is a plan view of an exemplary signal-bearing medium in accordance with the invention.

This signal-bearing media may comprise, for example, RAM (not shown) contained within one or more of the hosts 102–105, primary controllers 108–109, and/or secondary controllers 112–115. Alternatively, the instructions may be contained in another signal-bearing media, such as a magnetic data storage diskette 400 (FIG. 4), directly or indirectly accessible by a digital data processing apparatus as described above. Whether contained in the foregoing components or elsewhere, the instructions may be stored on a variety of machine-readable data storage media, such as DASD storage (e.g., a conventional "hard drive" or a RAID array), magnetic tape, electronic read-only memory (e.g., ROM, EPROM, EEPROM), an optical storage device (e.g. WORM, CD-ROM, DID, optical tape), paper "punch" cards, or other suitable signal-bearing media including transmission media such as digital and analog and communication links and wireless. In an illustrative embodiment of the invention, the machine-readable instructions may comprise lines of compiled PLX language source code with associated C language microcode.

Overall Sequence of Operation—Single Host Embodiment

Figure 5:
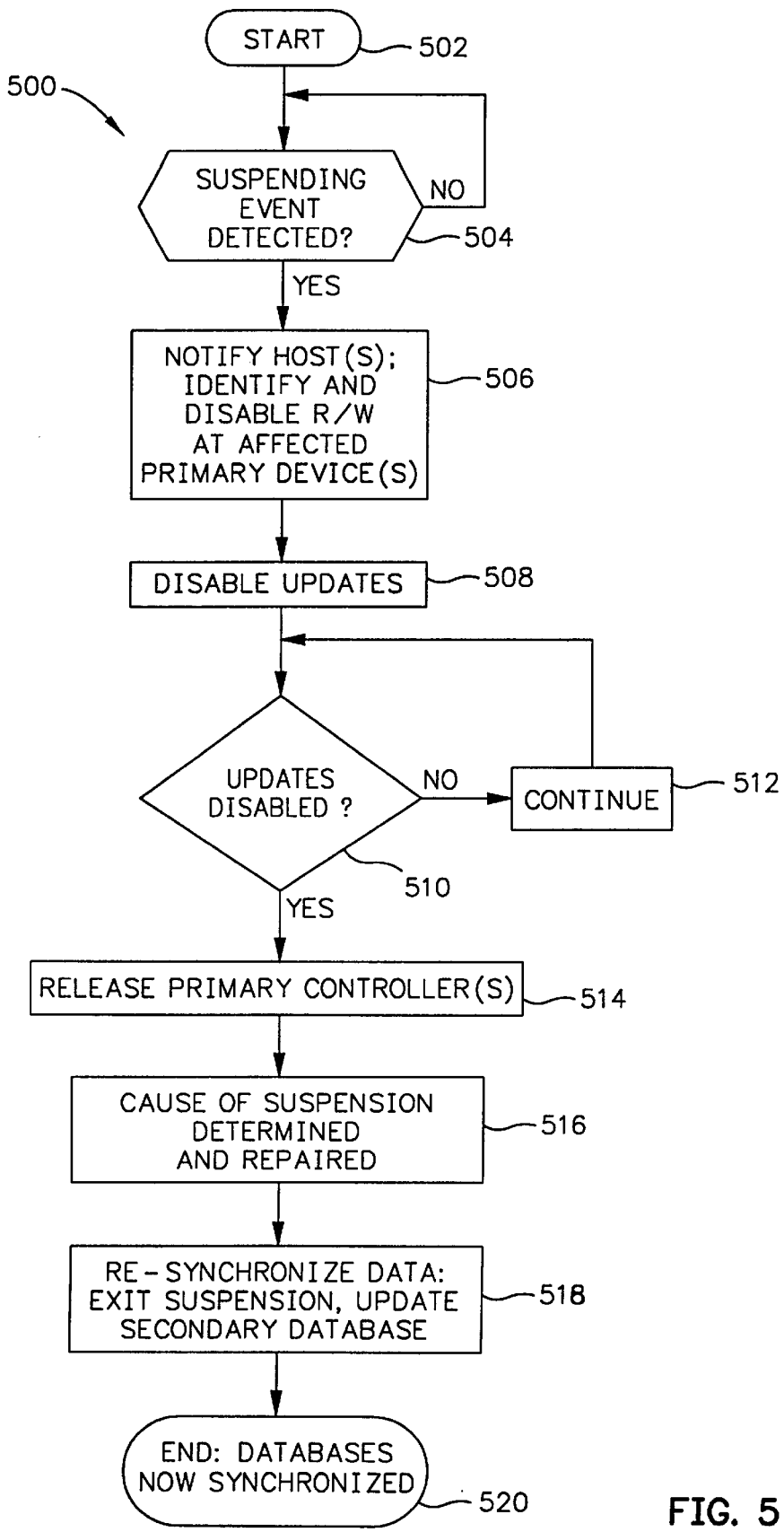
FIG. 5 is a flowchart of an illustrative operational sequence for ensuring consistency between primary and mirrored backup database copies.

FIG. 5 shows a sequence of method steps 500 to illustrate one example of the method aspect of the present invention. For ease of explanation, but without any limitation intended thereby, the example of FIG. 5 is described with reference to the single host DBMS 200 described above in FIG. 2. In the context of the DBMS 200, the routine 500 generally operates to ensure the consistency of backup data on the secondary data storage units 214–216, even if a component of the primary or secondary site becomes disabled. The steps are initiated in task 502.

Suspending Condition

In step 504, a "suspending condition" is detected. A suspending condition comprises an interruption in the storage of backup data, caused by a failure in a primary controller, a primary device, a secondary controller, a secondary device or a communication link between a secondary controller and its primary controller. More particularly, some examples of suspending conditions include:

1. Where a secondary device or data storage unit signals that it is "unavailable". This may occur, for example, due to a problem occurring in a storage device, the secondary controller, a cache component, device cache, etc.
2. Where the communications path between a secondary controller and its primary controller is broken. This break may occur, for example, due to failure of a component of the primary controller, a secondary controller, and/or a network used to interconnect the two.
3. A secondary controller or secondary data storage unit is powered down.
4. A suspending condition is manually triggered due to maintenance of the DBMS 200.
5. A primary data storage unit signals "unavailable". As illustrated, the suspending condition is detected by the primary controller 206. This may involve direct detection, or detection by another component (such as the host 202 or a secondary controller 208–210) that notifies the primary controller of the suspending condition. When the suspending condition is detected (step 504), control advances to step 506.

Taking Failed Device Down

After the primary controller detects a suspending condition in step 504, it notifies the host 202 of the suspending condition in step 506. Notification of the host is performed to enable the host 202 containing the map 204 to assist in failure mode operation of the DBMS 200 and in the ensuing recovery. In the no-host embodiment, the primary controller omits the notification feature of step 506, since the primary controller 206 itself contains the map 250. For ease of explanation, further explanation of the routine 500 is based on the single host embodiment as illustrated in FIG. 2. Ordinarily skilled artisans, having the benefit of this disclosure, will recognize that, in the non-host environment, the primary controller 206 may perform the database management and recovery functions otherwise performed by the host 202.

Also in step 506, the host 202 identifies the primary devices affected by the suspending condition. The "affected" devices include any devices containing data from the primary database(s) impacted by the suspending condition. For instance, if the suspending condition involves unavailability of a secondary device, the affected primary devices include all those containing part of any primary database mirrored on the unavailable secondary device. If the suspending condition involves unavailability of a primary device, the affected primary devices include the unavailable primary device and all other primary devices containing any portion of primary database(s) that also reside on the unavailable primary device. If the suspending condition involves a communications failure between the primary controller 206 and the secondary controller 208, the affected primary devices include all primary devices containing data from any primary database mirrored on the data storage unit 214. After identifying the affected primary devices, the host 202 causes the primary data storage device(s) affected by the failed read/write operation to disable all read/write operations. This may be achieved by the primary controller issuing a "disable R/W" command to the primary devices. The "disable R/W" command effectively disables these devices, aborting all input/output ("I/O") operations in progress at that device, and also preventing performance of any new I/O operations.

Disable Updates

After step 506, the host 202 issues a "disable updates" command to the primary controller 206. In response to host issuance of the "disable updates" command, the primary controller 206 executes this command by disabling updates performed by all attached secondary controllers that manage any part of the affected secondary databases.

More specifically, in step 508 the host 202 consults its map 204 to identify all secondary devices affected by the suspending condition. In other words, the host 202 references the map 204 to identify each secondary database (e.g., 226, 227, 228) having a device affected by the suspending condition. If the secondary device 230 fails, for example, the entire database 226–228 is affected and thus all devices 226–228. In this example, the host 202 identifies the primary controller to perform the "disable updates" for the affected secondary controllers 208–210.

Considering FIG. 2 as an example, where the device 230 has failed, the secondary controllers 208–210 each contain data from the same secondary database affected by the suspending condition. Table 1 depicts an example of an appropriate "disable updates" command for this situation, issued by the host 202 to an IBM 3990 (model 6) controller, where "X", "Y", and "Z" represent communications addresses of the secondary controllers 208–210.

TABLE 1

Disable Updates Sequence

FREEZE (SSID-X)
FREEZE (SSID-Y)
FREEZE (SSID-Z)

The "disable updates" operation is actually implemented by the primary controller 206 issuing appropriate individual "disable updates" commands to each secondary controller 208–210. Despite the primary controller having one or more of its primary devices with disabled RJW, the primary controller 206 can still issue the necessary "disable updates" commands since these do not involve I/O operations. Thus, the primary controller issues a "disable updates" command to all secondary controllers logically affected by the suspending condition.

The "disable updates" command may operate, for example, by severing a logical path between the primary and secondary controllers, causing the secondary controller to refuse future update instructions, or causing the primary to refrain from sending update information to its secondary controllers. In step 510, the host 202 (which issues the "disable updates" command) determines whether the command has been completed. As an example, this may be confirmed by the primary controller 206 receiving a signal from each secondary controller 208–210 confirming receipt or implementation of the "disable updates" command. The primary controller 206 forwards this information to the host 202, which thereby confirms full execution of the "disable updates" command. Steps 512 and 510 repeat until updating in all identified secondary sites stops.

Release Primary Controllers

As soon after completion of the "disable updates" command as possible, the host 202 in step 514 issues an "enable R/W" command to the primary controller 206, restoring the read/write ability of the primary device(s) disabled in step 506. After the device(s) is restored, it is once again available for read/write operations. Thus, the affected primary device (s) and the primary database 224 are only "down" for the brief period required to issue the "disable updates" commands (tasks 508–512), after which the primary database is fully available. In the IBM 3990 environment, this may take about one second.

Since updates are still disabled at this time, the primary controller 206 preferably begins "change recording" as soon as possible, to ease the updating of the secondary database when it is ultimately brought back on line. Change recording, for example, may be performed by maintaining a bit map corresponding to the tracks of the data storage unit 212; each bit of the bit map is set to a certain value, such as binary "one", whenever the corresponding track is updated while the affected secondary site is disabled. A more preferable approach is for the primary controller 206 or host to form an intermediate change, containing the changes to the primary database 224, the time of making the changes, and their location. With this approach, the changes can be entered in the secondary database 226-228 in the same order performed on the primary database 224, thereby ensuring consistency between the two mirrored databases.

Re-synchronize and Return to Normal Operation

After step 514, the primary controller 206 continues to perform I/O operations to the primary database normally until the suspending condition is repaired. During this time, the primary controller 206 effects change records, and the secondary controllers 208–210 are deactivated due to the previously issued "disable updates" commands.

After the cause of the original suspending condition is finally determined and repaired (step 516), the primary controller 206 reactivates and restores the secondary database 226–228. As an example, this may be performed under host control. As an example, the primary controller 206 may issue an "enable updates" command to the secondary controllers 208–210, and then update the secondary database 226–228 with the intermediate changes made to the primary database 224 as indicated by the change recording. The primary and secondary databases now being synchronized, the routine 500 ends in step 520.

Overall Sequence of Operation—Multi-Host Embodiment

Reference is again made to FIG. 5 to illustrate a different example of the method aspect of the present invention. In particular, the example of FIG. 5 is now described with reference to the multi-host DBMS 100 described above in FIG. 1. In the context of the DBMS 200, the routine 500 generally operates to ensure consistency of backup data on the secondary data storage units 118–121, even if a component of the primary or secondary site becomes disabled. These steps are initiated in task 502.

Suspending Condition

In step 504, a "suspending condition" is detected. Examples of suspending conditions are provided above. In the illustrated example, the suspending condition is detected by one or more of the hosts 102–105 that experience a failure in a requested read-write operation. Alternatively, the suspending condition may be detected by another component such as a primary controller 108 or 109, or a secondary controller 112–115. When the suspending condition is detected (step 504), control advances to step 506.

Taking Failed Device Down

After the suspending condition is detected in step 504, one of the hosts or primary controllers notifies the host 104 of the suspending condition in step 506. This notification is performed to enable the host 104, which contains the map 190, to assist in the failure mode operation of DBMS 200 and the ensuing recovery. Alternatively, instead of specifically notifying the host 104 containing the map 190, the notifying source may instead simply notify all hosts 102–105 to avoid having to keep track of which host contains the map 190.

Also in step 506, the host 104 identifies the primary devices affected by the suspending condition. The "affected" devices include any devices containing data from primary database(s) impacted by the suspending condition. For instance, if the suspending condition involves unavailability of a secondary device, the affected primary devices include all those containing part of any primary database mirrored on the unavailable secondary device. If the suspending condition involves unavailability of a primary device, the affected primary devices include the unavailable primary device and all other primary devices containing any portion of the primary database(s) that also reside on the unavailable primary device. If the suspending condition involves a communications failure between a primary controller and a secondary controller, the affected primary devices include all primary devices containing data from any primary database mirrored on the secondary data storage unit.

After identifying the affected primary devices, the host 104 causes the affected primary data storage device(s) to disable all read/write operations. This is preferably achieved by the associated primary controllers issuing "disable R/W" commands to these primary devices. As discussed above, each "disable R/W" command effectively disables a primary device, aborting all read or write operations in progress at that device, and also preventing performance of any new read or write operations.

Disable Updates

After step 506, the host 104 issues a "disable updates" command to all primary controllers whose data storage units contain devices affected by the suspending condition. In response to host issuance of the "disable updates" command, the identified primary controllers execute this command by disabling updates performed by all attached secondary controllers that manage any part of the affected secondary databases.

More specifically, in step 508 the host 104 consults its map 190 to identify all secondary devices affected by the suspending condition. In other words, the host 104 references the map 190 to identify each secondary database (e.g., 154–156/158) having a device affected by the suspending condition. If the secondary device 154 fails, for example, the entire secondary database contained on the secondary devices 154–156 and 158 is affected. In this example, the host 190 identifies the primary controllers 108 and 109 because they manage the primary database contained on the devices 150–151, which is mirrored on devices that include the failed device 154. Therefore, the primary controllers 108–109 are selected to implement the "disable updates" command by disabling the secondary controllers 112–115.

Considering FIG. 1 as an example, where the device 154 has failed, the secondary controllers 112–115 each contain data from the secondary database affected by the suspending condition. Table 2 depicts an example of an appropriate "disable updates" command for the situation issued by the host 102 to IBM 3990 (model 6) controller, where "A", "B", "C", and "D" represent communication addresses of the secondary controllers 112–115.

TABLE 2

Disable Updates Sequence

FREEZE (SSID-A)
FREEZE (SSID-B)
FREEZE (SSID-C)
FREEZE (SSID-D)

The "disable updates" operation is actually implemented by the primary controllers 108–109 issuing appropriate individual "disable updates" commands to each secondary controller 112–115. Despite the primary controllers having one or more of their primary devices with disabled RIW, the primary controllers 108–109 can still issue the necessary "disable updates" commands since these do not involve updates of the database on the individual devices. Thus, the primary controllers 108–109 performs a "disable updates" command for all secondary controllers logically affected by the suspending condition.

The "disable updates" command may operate, for example, as discussed in greater detail above. In step 510, the host 104 (which issues the "disable updates" command) determines whether the command has been completed. As an example, this may be confirmed by the primary controllers 108–109 receiving signals from each secondary controller 112–115 confirming receipt or implementation of the "disable updates" commands or the primary controller(s) signalling completion to the host. The primary controllers 108–109 communicate this information to host 104, which thereby confirms full execution of the "disable updates" command. Steps 512 and 510 repeat until updating in all identified secondary sites stops.

Release Primary Controllers

As soon after completion of a "disable updates" command is possible, the host 104 in step 514 issues an "enable R/W" command to the primary controllers 108–109, restoring the read/write ability of the primary device(s) disable in step 506. After the device(s) is restored, it is once again available for read/write operations. Thus, the affected primary device(s) and the primary database are only "down" for the brief period required to issue the "disable updates" commands (tasks 508–512), after which the primary database is fully available. In the IBM 3990 environment this may take about one second.

Since updates are still disabled at this time, the primary controllers 108–109 preferably begin "change recording" as soon as possible as discussed in greater detail above.

Re-Synchronize and Return to Normal Operation

After step 514, the primary controllers 108–109 continue to perform I/O operations to the primary database normally until the suspending condition is repaired. During this time, the primary controllers 108–109 effect change records, and the secondary controllers 112–115 are deactivated due to the previously issued "disable updates" commands.

After the cause of the original suspending condition is finally determined and repaired (step 516), the primary controllers 108–109 reactivate and restore the secondary database. As an example, this may be performed under control by the host 104. More particularly, the primary controllers 108–109 may issue "enable updates" commands to the secondary controllers 112–115, and then update the secondary database 154–156/158 with the intermediate changes made to the primary databases indicated by change recording. The primary and secondary databases now being synchronized, the routine 500 ends in step 520.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

One modification, for example, is that suspending conditions occurring in a primary controller or primary data storage unit may be treated as a secondary failure. In this event, the secondary controller may be treated as a primary controller, which disables all of its affected devices, issues an appropriate "disable" command to the affected primary controller, and continues the process 500 with the primary and secondary components in reversed roles.

What is claimed is:

1. A method for maintaining backup data in a database management system (DBMS) including at least one primary controller, multiple primary data storage devices each coupled to one of the primary controllers, multiple secondary data storage devices each coupled to one of multiple secondary controllers, each secondary controller being coupled to one of the primary controllers, wherein one or more primary databases reside on the primary data storage devices and a corresponding number of secondary databases reside on the secondary data storage devices, wherein the DBMS updates each secondary database to mirror its corresponding primary database, each corresponding primary and secondary database together constituting a mirrored pair, the method comprising:

at a first time, detecting unavailability of a first database for read/writes, said first database being a member of a first mirrored pair including the first database and a counterpart database;

identifying all primary and secondary data storage devices containing any data of the first mirrored pair of databases, said identified primary and secondary data storage devices constituting affected primary and secondary devices;

discontinuing all read/write operations by the affected primary devices ongoing at the first time, also preventing future read/write by the affected primary devices;

instructing each secondary controller coupled to any affected secondary devices to terminate updating of the affected secondary devices;

detecting termination of updating by the secondary controllers, and in response thereto, resuming read/writes with the affected primary devices;

each primary controller coupled to affected primary devices receiving changes to the primary database of the first mirrored pair, and in response thereto, logging the received changes;

detecting removal of the suspending condition, and in response thereto, resynchronizing the secondary database of the mirrored pair by:

applying the logged changes to the secondary devices containing the secondary database of the mirrored pair; and instructing the secondary controllers to resume updating of the secondary database of the mirrored pair to mirror its corresponding primary database.

2. The method of claim 1, each primary controller being coupled to at least one host computer.

3. The method of claim 2, the detecting of the first database's unavailability for read/writes being performed by one of the host computers experiencing a failed read/write operation.

4. The method of claim 1, the first database being one of the primary databases, and the counterpart database being a corresponding one of the secondary databases.

5. The method of claim 1, the first database being one of the secondary databases, and the counterpart database being a corresponding one of the primary databases.

6. The method of claim 2, the identifying of all primary and secondary data storage devices containing any data of the first mirrored pair of databases comprising:
the host or primary controller accessing a machine-readable map associating primary and secondary data storage devices with databases contained thereon.

7. The method of claim 2, where:
the at least one primary controller is a single primary controller;
the primary controller contains a machine-readable map associating primary and secondary data storage devices with databases contained thereon; and
the identifying of all primary and secondary data storage devices containing any data of the first mirrored pair of databases comprises the primary controller accessing the map.

8. The method of claim 1, the discontinuing of all read/write operations with the affected primary devices ongoing at the first time and preventing of future read/writes with the affected primary devices comprising:
the primary controllers coupled to affected primary devices causing discontinuance of all read/write operations with the affected primary devices ongoing at the first time and prevention of future read/writes with the affected primary devices by issuing a DISABLE READ/WRITES command to its affected devices.

9. The method of claim 1, the at least one primary controller comprising multiple primary controllers.

10. The method of claim 1, the suspending condition comprising one of the primary or secondary data storage units sending a message that it is unavailable for input/output operations.

11. The method of claim 1, the suspending condition comprising an interruption in communications between a primary controller and one or more secondary controllers.

12. The method of claim 1, the suspending condition comprising a cache failure occurring in one of the secondary data storage units.

13. The method of claim 1, the suspending condition comprising one of the primary data storage units.

14. The method of claim 1, the suspending condition comprising removal of electrical power from a secondary controller.

15. The method of claim 2, the detecting of discontinuance of updating of the secondary database being performed by the host, wherein the host issues an ENABLE READ/WRITES command to the primary controller and, in response to the ENABLE READ/WRITES command, the primary controller resumes exchanges of data with the primary data storage devices.

16. The method of claim 1, the logging of changes to the primary database comprising maintenance of a bit map where each bit represents status of a corresponding section of the primary database as being changed or unchanged since the discontinuing of all read/write operations by the affected primary devices.

17. The method of claim 1, the primary data storage units comprising magnetic data storage disks, the sections comprising storage tracks.

18. The method of claim 1, the logging of changes to the primary database comprising logging each change made to the primary database, a time of said change, and an address of said change in the primary database.

19. The method of claim 1, the discontinuance of all read/write operations discontinuing any read or write operation being performed by an affected primary device.

20. The method of claim 1, the first database comprising a primary database, the method further comprising:
applying the logged changes to the primary devices containing the first database.

21. The method of claim 1, the instructing of each secondary controller coupled to any affected secondary devices to terminate updating of the affected secondary devices comprising:
the primary controllers coupled to secondary controllers that are coupled to an affected secondary device sending commands to said secondary controllers to terminate updating of the affected secondary devices.

22. The method of claim 1, the detecting of termination of updating by the secondary controllers comprising:
the primary controllers receiving confirmation signals from the secondary controller coupled to affected secondary devices.

23. A database management system, comprising:
at least one primary controller;
multiple primary data storage devices each coupled to one of the primary controllers;
multiple secondary controllers, each coupled to one of the primary controllers;
multiple secondary data storage devices each coupled to one of the secondary controllers;
multiple primary databases residing on the primary data storage devices and a corresponding number of secondary databases residing on the secondary data storage devices
wherein the primary controllers and secondary controllers are programmed to perform a method for managing the primary and secondary databases, said method comprising:
updating each secondary database to mirror contents of its corresponding primary database;
at a first time, detecting unavailability of a first database for read/writes, said first database being a member of a first mirrored pair including the first database and a counterpart database;
identifying all primary and secondary data storage devices containing any data of the first mirrored pair of databases, said identified primary and secondary data storage devices constituting affected primary and secondary devices;
discontinuing all read/write operations by the affected primary devices ongoing at the first time, also preventing future read/write by the affected primary devices;
instructing each secondary controller coupled to any affected secondary devices to terminate updating of the affected secondary devices;
detecting termination of updating by the secondary controllers, and in response thereto, resuming read/writes with the affected primary devices;
each primary controller coupled to affected primary devices receiving changes to the primary database of the first mirrored pair, and in response thereto, logging the received changes;
detecting removal of the suspending condition, and in response thereto, resynchronizing the secondary database of the mirrored pair by:
applying the logged changes to the secondary devices containing the secondary database of the mirrored pair; and instructing the secondary controllers to resume updating of the secondary database of the mirrored pair to mirror its corresponding primary database.

24. The system of claim 23, each primary controller being coupled to at least one host computer.

25. The system of claim 24, the detecting of the first database's unavailability for read/writes being performed by one of the host computers experiencing a failed read/write operation.

26. The system of claim 23, the first database being one of the primary databases, and the counterpart database being a corresponding one of the secondary databases.

27. The system of claim 23, the first database being one of the secondary databases, and the counterpart database being a corresponding one of the primary databases.

28. The system of claim 24, the identifying of all primary and secondary data storage devices containing any data of the first mirrored pair of databases comprising: the host accessing a machine-readable map associating primary and secondary data storage devices with databases contained thereon.

29. The system of claim 24, where:
the at least one primary controller is a single primary controller;
the primary controller contains a machine-readable map associating primary and secondary data storage devices with databases contained thereon; and
the identifying of all primary and secondary data storage devices containing any data of the first mirrored pair of databases comprises the primary controller accessing the map.

30. The system of claim 23, the discontinuing of all read/write operations with the affected primary devices ongoing at the first time and preventing of future read/writes with the affected primary devices comprising:
the primary controllers coupled to affected primary devices causing discontinuance of all read/write operations with the affected primary devices ongoing at the first time and prevention of future read/writes with the affected primary devices by issuing a DISABLE READ/WRITES command to its affected devices.

31. The system of claim 23, the at least one primary controller comprising multiple primary controllers.

32. The system of claim 23, the suspending condition comprising one of the primary or secondary data storage units sending a message that it is unavailable for input/output operations.

33. The system of claim 23, the suspending condition comprising an interruption in communications between a primary controller and one or more secondary controllers.

34. The system of claim 23, the suspending condition comprising a cache failure occurring in one of the secondary data storage units.

35. The system of claim 23, the suspending condition comprising one of the primary data storage units.

36. The system of claim 23, the suspending condition comprising removal of electrical power from a secondary controller.

37. The system of claim 24, the detecting of discontinuance of updating of the secondary database being performed by the host, wherein the host issues an ENABLE READ/WRITES command to the primary controller and, in response to the ENABLE READ/WRITES command, the primary controller resumes exchanges of data with the primary data storage devices.

38. The system of claim 23, the logging of changes to the primary database comprising maintenance of a bit map where each bit represents status of a corresponding section of the primary database as being changed or unchanged since discontinuance of all read/write operations by the affected primary devices.

39. The system of claim 23, the primary data storage units comprising magnetic data storage disks, the sections comprising storage tracks.

40. The system of claim 23, the logging of changes to the primary database comprising logging each change made to the primary database, a time of said change, and an address of said change in the primary database.

41. The system of claim 23, the discontinuance of all read/write operations discontinuing any read or write operation being performed by an affected primary device.

42. The system of claim 23, the first database comprising a primary database, the method further comprising:
applying the logged changes to the primary devices containing the first database.

43. The system of claim 23, the instructing of each secondary controller coupled to any affected secondary devices to terminate updating of the affected secondary devices comprising:
the primary controllers coupled to secondary controllers that are coupled to an affected secondary device sending commands to said secondary controllers to terminate updating of the affected secondary devices.

44. The system of claim 23, the detecting of termination of updating by the secondary controllers comprising:
the primary controllers receiving confirmation signals from the secondary controller coupled to affected secondary devices.

* * * * *

UNITED STATES PATENT AND TRADEMARK OFFICE
CERTIFICATE OF CORRECTION

PATENT NO.    : 6,199,074 B1
DATED         : March 6, 2001
INVENTOR(S)   : Kern et al.

It is certified that error appears in the above-identified patent and that said Letters Patent is hereby corrected as shown below:

<u>Title page,</u>
Item [75], Inventors, after inventor "Jeffrey Mark Nick" delete "Fishkill" and replace with -- West Park --.

<u>Column 9,</u>
Line 20, after word "unavailable.", a new paragraph should be inserted, so that the following sentence starts a new paragraph flush with the left margin.

Signed and Sealed this

Sixth Day of August, 2002

*Attest:*

JAMES E. ROGAN
*Director of the United States Patent and Trademark Office*

*Attesting Officer*